United States Patent
Boutaghou et al.

(10) Patent No.: US 6,647,612 B1
(45) Date of Patent: Nov. 18, 2003

(54) METHOD FOR CONSTRUCTING AN ULTRA-LOW-FLYING-HEIGHT SLIDER

(75) Inventors: Zine-Eddine Boutaghou, Vadnais Heights, MN (US); Jorge Vicente Hanchi, Minneapolis, MN (US); Andreas Argyros Polycarpou, Eden Prairie, MN (US); Thomas Roy Pitchford, Bloomington, MN (US); Anthony Pascal Sannino, Shakopee, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 353 days.

(21) Appl. No.: 09/776,814

(22) Filed: Feb. 5, 2001

Related U.S. Application Data

(62) Division of application No. 09/376,596, filed on Aug. 18, 1999, now Pat. No. 6,304,418.
(60) Provisional application No. 60/119,692, filed on Feb. 11, 1999.

(51) Int. Cl.$^7$ ............................................. G11B 5/127
(52) U.S. Cl. ........................... 29/603.12; 29/603.16; 360/235.4; 360/235.6; 360/236.9
(58) Field of Search ........................ 29/603.12, 603.16; 360/235.4, 236.4, 236.9

(56) References Cited

U.S. PATENT DOCUMENTS

| | | | |
|---|---|---|---|
| 4,984,114 A | 1/1991 | Takeuchi et al. | 360/103 |
| 5,034,828 A | 7/1991 | Ananth et al. | 360/75 |
| 5,067,037 A | 11/1991 | Ananth et al. | 360/103 |
| 5,200,867 A | 4/1993 | Albrecht et al. | 360/103 |
| 5,278,711 A | 1/1994 | Gregory et al. | 360/103 |
| 5,345,353 A | 9/1994 | Krantz et al. | 360/103 |
| 5,388,017 A | 2/1995 | Franco et al. | 360/103 |
| 5,418,667 A | 5/1995 | Best et al. | 360/103 |
| 5,550,693 A | 8/1996 | Hendriks et al. | 360/103 |
| 5,557,488 A | 9/1996 | Hamilton et al. | 360/104 |
| 5,734,519 A * | 3/1998 | Fontana et al. | 360/97.01 |
| 5,781,377 A | 7/1998 | Koka et al. | 360/103 |
| 5,796,551 A * | 8/1998 | Samuelson | 360/236.8 |
| 5,805,380 A | 9/1998 | Ishihara et al. | 360/103 |
| 5,808,833 A | 9/1998 | Motomatsu et al. | 360/235.2 |
| 5,822,153 A | 10/1998 | Lairson et al. | 360/104 |
| 5,841,608 A | 11/1998 | Kasamatsu et al. | 360/103 |
| 5,898,540 A | 4/1999 | Maruyama et al. | 360/103 |
| 5,909,340 A | 6/1999 | Lairson et al. | 360/237.1 |
| 5,930,077 A | 7/1999 | Obata et al. | 360/235.1 |
| 5,949,612 A | 9/1999 | Gudeman et al. | 360/97.01 |
| 5,966,800 A * | 10/1999 | Huai et al. | 29/603.13 |
| 5,991,118 A | 11/1999 | Kasamatsu et al. | 360/236.6 |
| 5,991,120 A | 11/1999 | Sato | 360/246.2 |
| 5,995,324 A * | 11/1999 | Haddock et al. | 360/234.7 |
| 6,014,288 A | 1/2000 | Cha et al. | 360/236.6 |
| 6,040,958 A | 3/2000 | Yamamoto et al. | 360/236.3 |
| 6,072,663 A | 6/2000 | Yokohata et al. | 360/235.8 |
| 6,101,066 A | 8/2000 | Ishihara et al. | 360/236.6 |
| 6,118,635 A | 9/2000 | Maruyama et al. | 360/246.2 |
| 6,160,685 A | 12/2000 | Hamilton | 360/246.2 |
| 6,172,851 B1 | 1/2001 | Utsunomiya | 360/236.3 |
| 6,181,519 B1 | 1/2001 | Kim | 360/236.6 |
| 6,188,547 B1 | 2/2001 | Gui et al. | 360/236.2 |
| 6,195,235 B1 | 2/2001 | Boutaghou et al. | 360/235.2 |
| 6,236,543 B1 * | 5/2001 | Han et al. | 360/236.6 |
| 6,243,234 B1 | 6/2001 | Haddock et al. | 360/237.1 |
| 6,246,538 B1 | 6/2001 | Kasamatsu et al. | 360/97.01 |

* cited by examiner

Primary Examiner—Carl J. Arbes
Assistant Examiner—Tai Nguyen
(74) Attorney, Agent, or Firm—Kinney & Lange, P.A.

(57) ABSTRACT

A method is disclosed for constructing an ultra-low-flying-height slider for carrying a transducing head in a disc drive system including a rotatable disc. The method comprises removing material from an air bearing surface of the slider to create a channel at a likely location of contact with the rotatable disc and filling the channel with a low-friction, high-wear-resistance material. The channel is filled such that the air bearing surface is configured the same as the air bearing surface configuration prior to removing material.

20 Claims, 7 Drawing Sheets

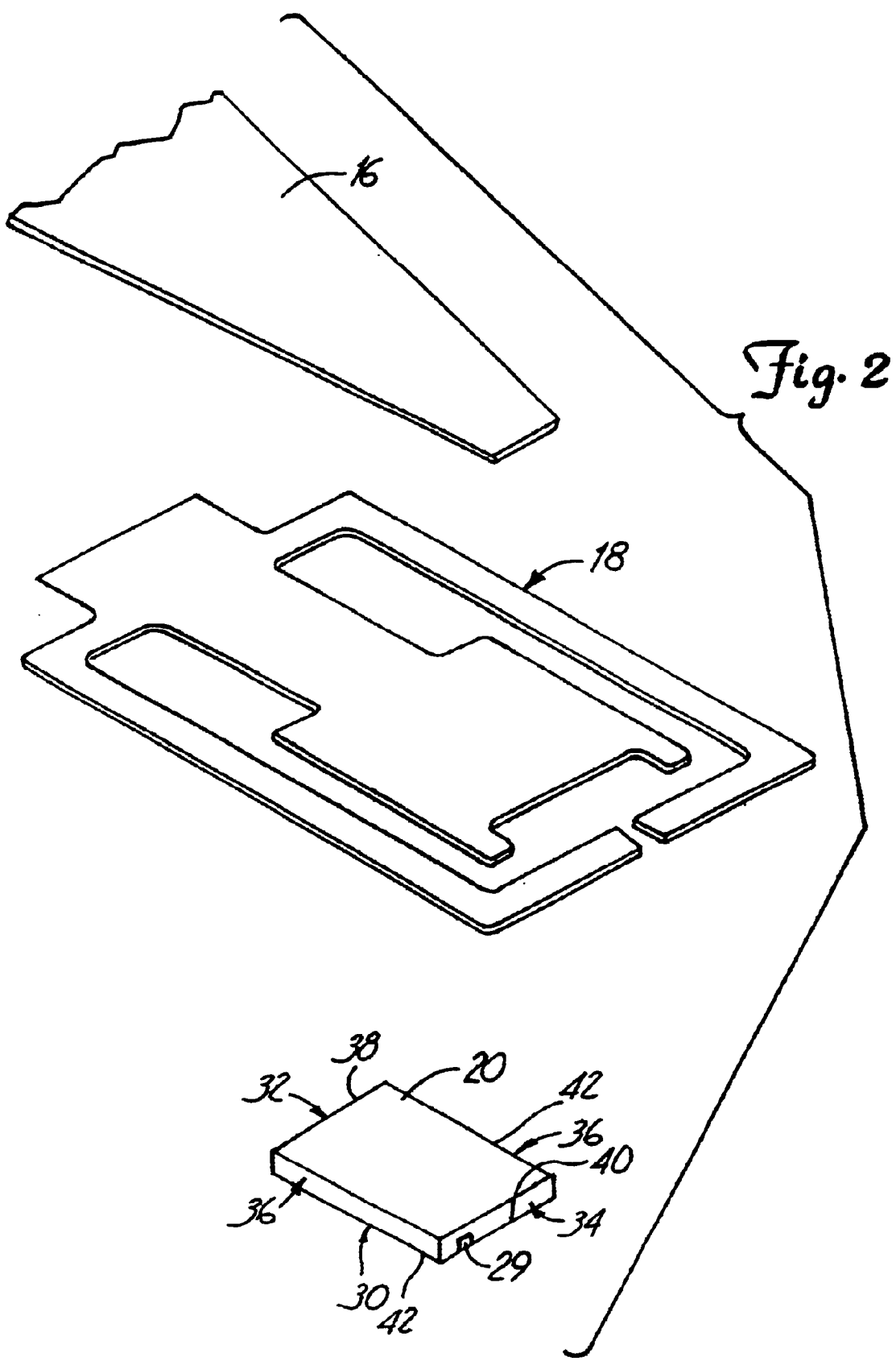

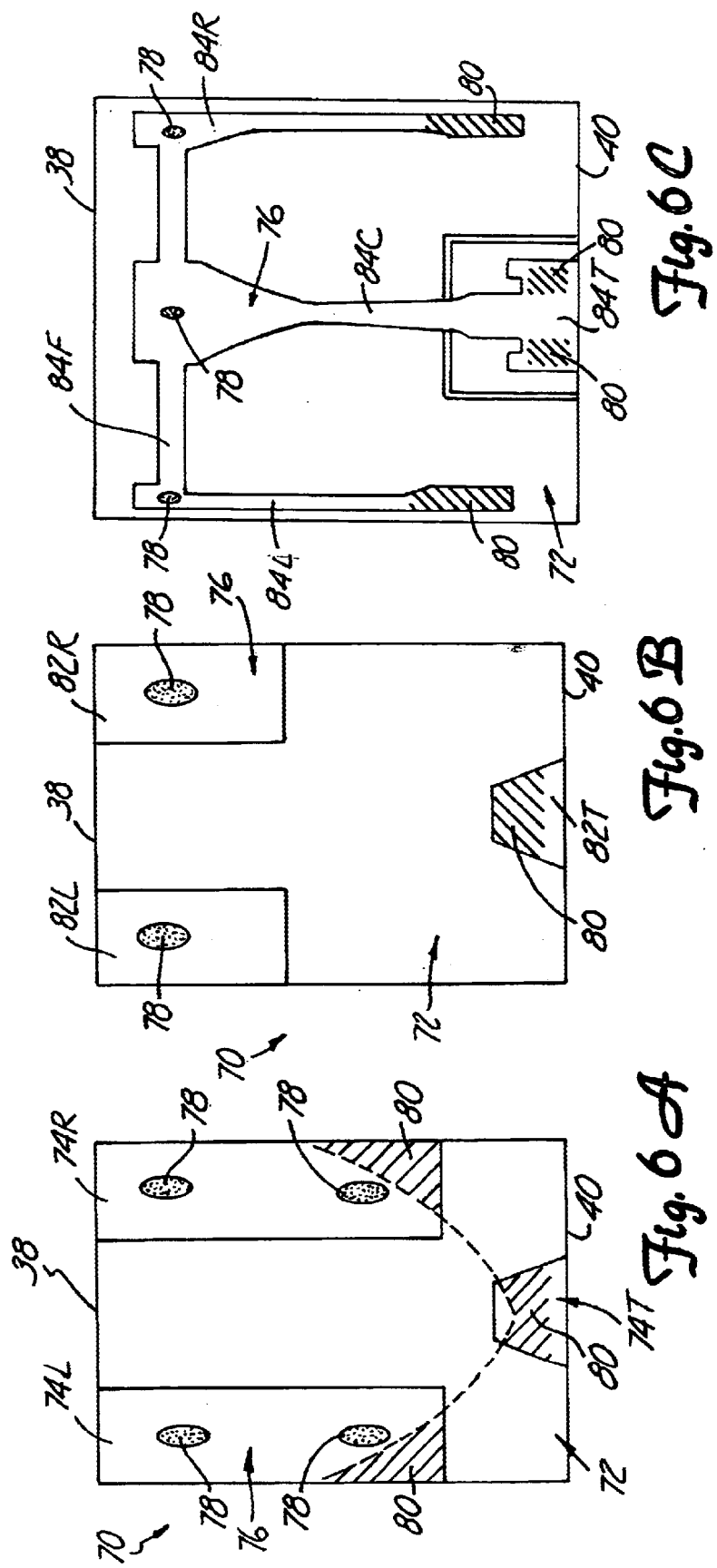

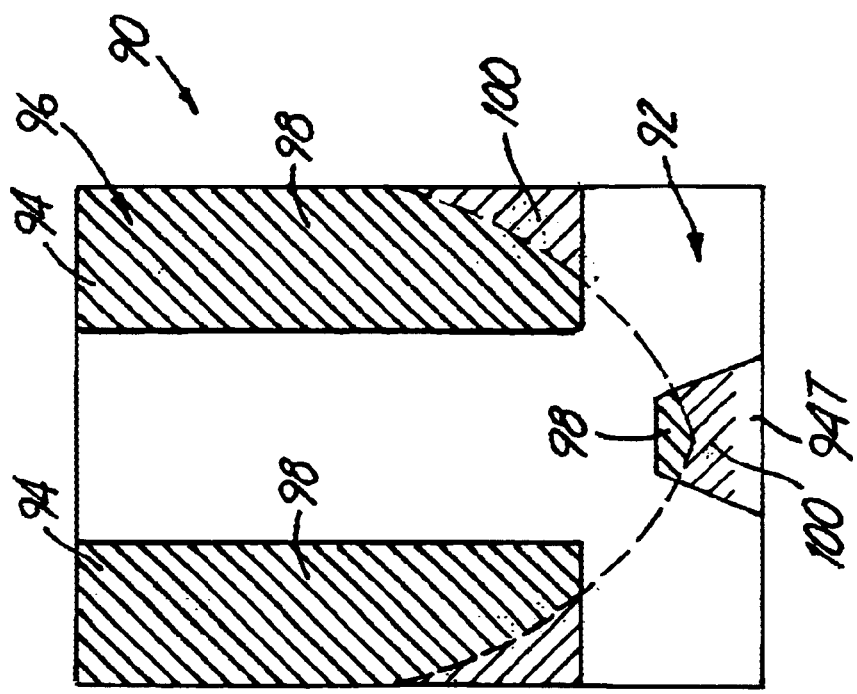

METHOD FOR CONSTRUCTING AN ULTRA-LOW-FLYING-HEIGHT SLIDER

CROSS-REFERENCE TO RELATED APPLICATION(S)

This application claims priority from U.S. patent application Ser. No. 09/376,596, filed Aug. 8, 1999 for "Enhanced Durability Ultra-Low-Flying-Height Sliders" by Zine-Eddine Boutaghou, Jorge Vicente Hanchi, Andreas Argyros Polycarpou, Thomas Roy Pitchford, and Anthony Pascal Sannino, now U.S. Pat. No. 6,304,418 that issued on Oct. 16, 2001.

This application also claims priority from provisional application No. 60/119,692, filed Feb. 11, 1999 for "Enhanced Durability Ultra Low Flying Height Sliders" by Zine-Eddine Boutaghou, Jorge Vicente Hanchi, Andreas Argyros Polycarpou, Thomas Roy Pitchford, and Anthony Pascal Sannino.

BACKGROUND OF THE INVENTION

The present invention relates to air bearing sliders for carrying a transducing head in a disc drive. More particularly, it relates to an air bearing slider capable of operation at ultra-low flying heights.

Air bearing sliders have been extensively used in magnetic disc drives to appropriately position a transducing head above a rotating magnetic disc. In most high capacity magnetic storage applications, when the disc is at rest, the air bearing slider is in contact with the disc. During operation, the disc rotates at high speeds, which generates a "wind" of air immediately adjacent to the flat surface of the disc. This wind acts upon a lower air bearing surface of the slider and generates a force directing the slider away from the disc and against a load beam causing the slider to "fly" a small distance above the disc. A slider is typically mounted on a gimbal and load beam assembly which biases the slider toward the rotating disc, providing a spring force opposite to the bearing force of the wind incident on the air bearing surface of the slider.

For the disc drive to function properly, the slider must maintain the proper fly height, and the load beam assembly must provide adequate air bearing stiffness to assure that the slider does not contact the disc. Also, the air bearing slider must have a low takeoff speed and low stiction at start up to limit disc contact and thus damage during takeoff and landing of the slider. This is also important to limit slider wear.

As magnetic disc storage systems are designed for greater and greater storage capacities, the density of concentric data tracks on magnetic discs is increasing (that is, the size of data tracks and radial spacing between data tracks is decreasing), requiring that the air bearing gap between the transducer carried by the slider and the rotating magnetic disc be reduced. A requirement for achieving a small air bearing gap is increased disc smoothness. Increased disc smoothness leads to increased stiction between the disc and the air bearing surface of the slider. Increased stiction is detrimental because it requires increased energy during startup of the rotation of the magnetic disc.

One aspect of achieving higher data storage densities in magnetic discs is operating the air bearing slider at ultra-low flying heights. As air bearing slider flying heights reach ultra-low levels, contact between the transducing head on the air bearing surface of a slider and the magnetic disc are essentially unavoidable. When a disc drive is subjected to a mechanical shock of sufficient amplitude, the slider may overcome the biasing force of the load beam and lift off from the disc. Damage to the disc may occur when the slider returns to the disc and impacts the disc under the biasing force of the load beam. Such contact can result in catastrophic head-disc interface failure. Damage to the disc may occur which can result in loss or corruption of data or, in a fatal disc "crash," render the disc drive inoperable. Contact resulting in catastrophic failure is more likely to occur in ultra-low flying height systems.

There is a need in the art for a slider having an air bearing surface that will minimize catastrophic head-disc interface failure upon contact of the slider with the disc, while maintaining proper fly height and adequate air bearing stiffness. Also, there is a need in the art for a slider having an air bearing surface that will minimize stiction and friction between the slider and the surface of the magnetic disc.

BRIEF SUMMARY OF THE INVENTION

The present invention is a slider having an air bearing surface designed to minimize catastrophic head-disc interface failure upon contact of the slider with the disc during operation. The slider carries a head for transducing data with a concentric track of a disc. The slider includes a slider body having a leading edge and a trailing edge. The slider body also has a disc opposing face. The slider also includes an air bearing surface formed on the disc opposing face of the slider body. The air bearing surface includes a plurality of projections extending from the surface for providing lift to the slider body when the disc is rotating. At least a portion of at least one of the plurality of projections is constructed from a low-friction, high-wear-resistance material distinct from the material used to construct the slider body and the remainder of the plurality of projections.

The present invention also includes a method for constructing an ultra-low-flying-height slider for carrying a transducing head in a disc drive system including a rotatable disc. The method includes the step of removing material from an air bearing surface of the slider to determine the location where contact with the rotatable disc is likely to occur. Next, the method includes filling the channel with a low-friction, high-wear-resistance material such that the air bearing surface is configured the same as the air bearing surface configuration prior to removing material to create the channel.

BRIEF DESCRIPTION OF THE DRAWINGS

FIG. 2 shows an exploded perspective view of the distal portion of the disc drive actuation system of FIG. 1.

FIGS. 6A–6C show a bottom view of a slider according to a second embodiment of the present invention.

FIG. 7 shows a bottom view of a slider according to a third embodiment of the present invention.

DETAILED DESCRIPTION

Figure 1:
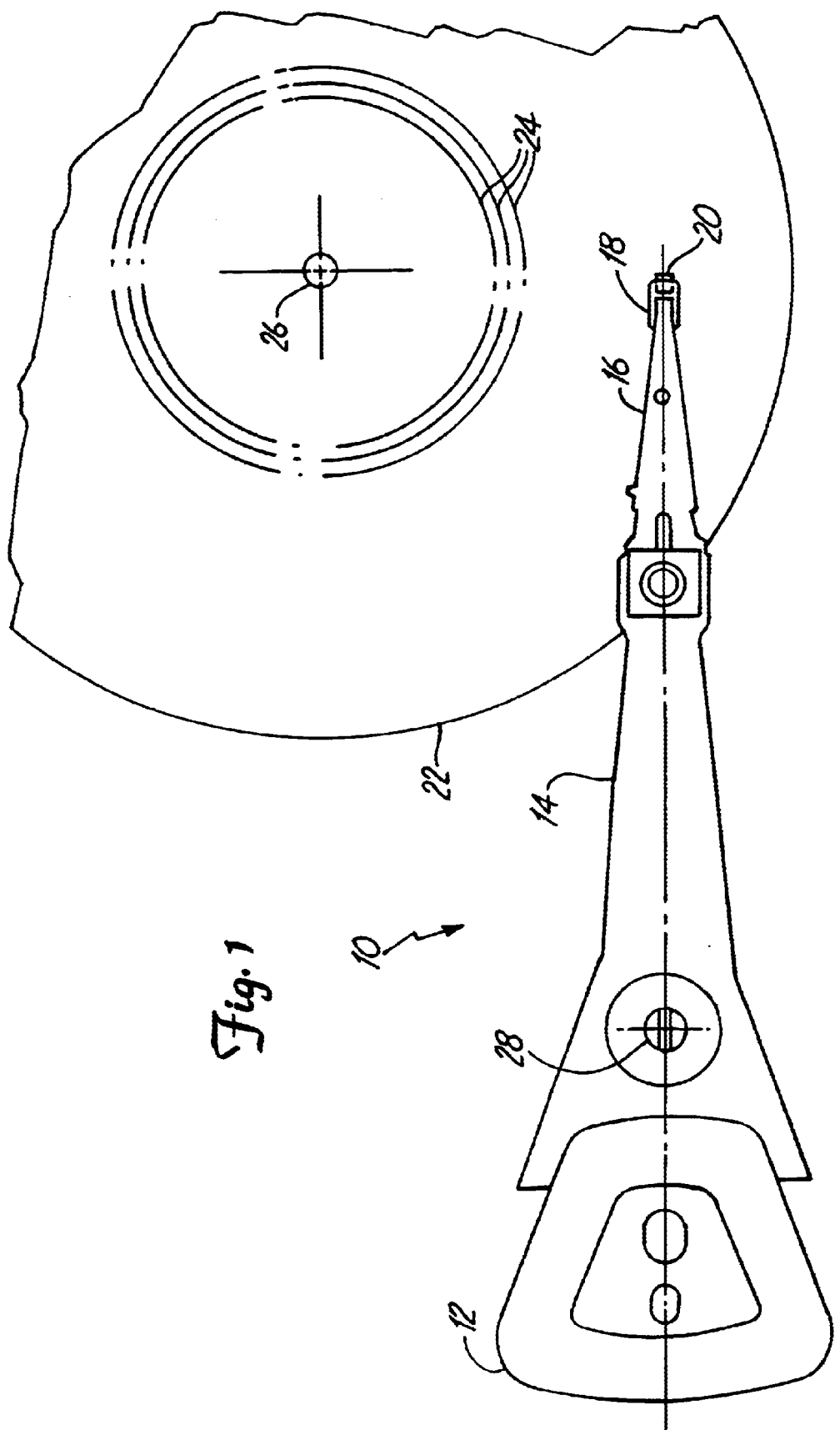
FIG. 1 shows a top view of a disc drive actuation system for positioning a slider over tracks of a disc.

FIG. 1 shows a top view of a disc drive actuation system 10 for positioning a transducing head (not shown) over a track of a magnetic disc as known in the prior art. The actuation system 10 includes, as shown from left to right in FIG. 1, a voice coil motor (VCM) 12, an actuator arm 14, a suspension 16, a flexure 18, and a slider 20. The slider 20 is connected to the distal end of the suspension 16 by the flexure 18. The suspension 16 is connected to the actuator arm 14 which, in turn, is coupled to the VCM 12. As shown on the right side of FIG. 1, the disc drive assembly includes a disc 22, having a multiplicity of tracks 24, which rotates about an axis 26. During operation of the disc drive assembly, rotation of the disc 22 generates air movement which is encountered by the slider 20. This air movement acts to keep the slider 20 aloft a small distance above the surface of the disc 22 allowing the slider to fly above the surface of the disc 22. The VCM 12 is selectively operated to move the actuator arm 14 around an axis 28 thereby moving the suspension 16 and positioning the transducing head (not shown) carried by the slider 20 between tracks 24 of the disc 22. Proper positioning of the transducing head (not shown) is necessary for reading and writing of data on the concentric tracks 24 of the disc 22.

FIG. 2 is an exploded perspective view of the distal portion of a disc drive actuation system 10 (shown on the right hand side in FIG. 1) as known in the prior art. Shown in FIG. 2, from top to bottom, are the suspension 16, the flexure 18, and the slider 20 carrying the transducing head 29. The flexure 18 is attached to the suspension 16 and the slider 20 attaches to a bottom surface of the flexure 18. The transducing head 29 is carried by the slider 20. The flexure 18 provides a spring connection between the slider 20 and the suspension 16. The flexure 18 is configured such that it allows the slider 20 to move in pitch and roll directions to compensate for fluctuations in the spinning surface of the disc 22. Many different types of flexures 18, also known as gimbals, are known to provide the spring connection allowing for pitch and roll movement of the slider 20 and can be used with the present invention.

As shown in FIG. 2, the air bearing slider 20 includes a disc opposing face 30 bounded by a leading face 32, a trailing face 34, and side faces 36 running from the leading face 32 to the trailing face 34. The leading face 32 and the trailing face 34 are generally polished smooth, while the side faces 36 may be relatively rough. The disc opposing face 30 intersects the leading face 32 at a leading edge 38, intersects the trailing face 34 at a trailing edge 40, and intersects the side faces 36 at side edges 42. During operation of the disc drive system 10, the disc opposing face 30 is directed toward the disc 22. The contours of the disc opposing face 30 generally determine the flying characteristics of the air bearing slider 20.

The contour of the disc opposing face of an air bearing slider has a significant effect on the flying characteristics of the air bearing slider, and various contours have been proposed and used for air bearing sliders. Examples of two of these are included in U.S. Pat. No. 5,062,017 to Strom, et al. and U.S. Pat. No. 5,343,343 to Chapin, both of which are assigned to Seagate Technology, Inc, the assignee of the present invention and are hereby incorporated by reference. The slider must maintain adequate roll, pitch, and normal stiffness over the predetermined concentric data track, corresponding to a range of operating speeds, and over a predetermined range of skew angles (i.e., the angle between the longitudinal axis of the slider and the tangential disc velocity vector).

Figure 3A:
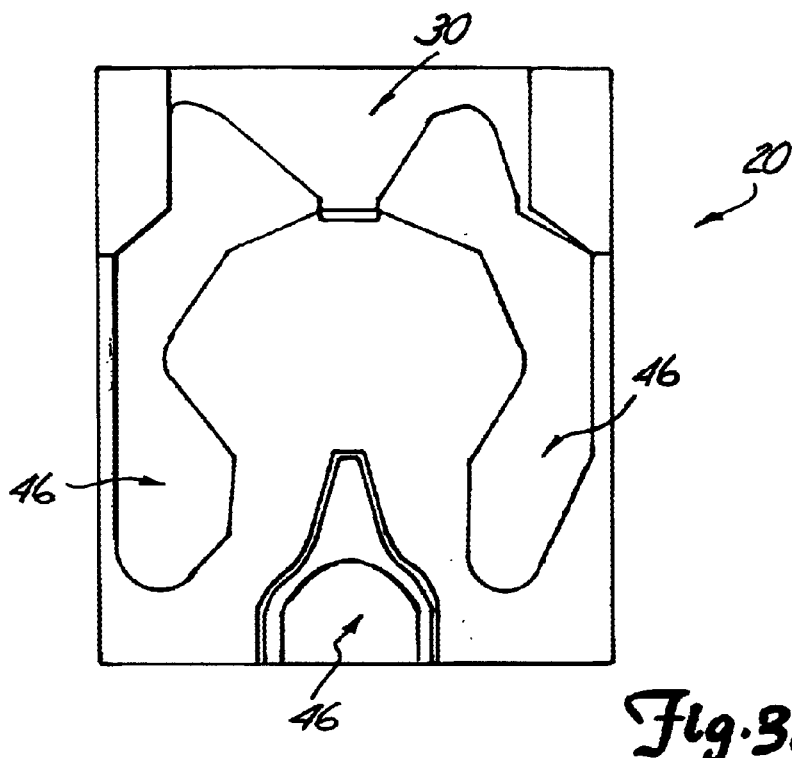
FIGS. 3A and 3B show a plan view of an air bearing surface of a slider.
Figure 3B:
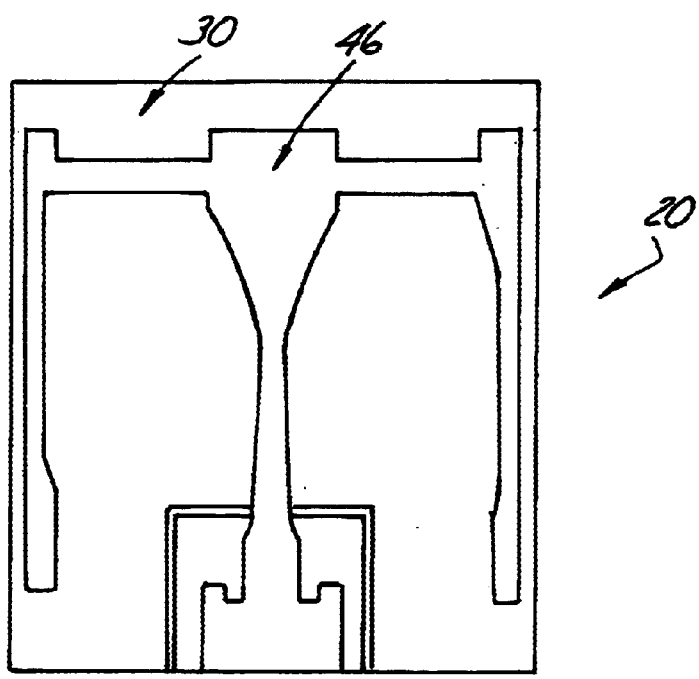

FIGS. 3A and 3B show plan views of the disc opposing face 30 as known in the prior art. FIG. 3A shows a plan view of the configuration of the disc opposing face 30 used on a slider in a disc drive system 10 having a high preload design. The preload is the amount of force loaded into the suspension 16 when the air bearing slider 20 is placed into its operating position adjacent to the disc 22. A typical high preload is approximately 2.5 grams.

FIG. 3B shows a plan view of the disc opposing face 30 of an air bearing slider 20 in a disc drive actuation system 10 having a low preload design. A typical low preload design is approximately 0.5 grams. As can be seen from FIG. 3B, the disc opposing face 30 of the air bearing slider 20 having a low preload design has a significantly smaller surface area than the air bearing surface 46 of the disc opposing face 30 of the air bearing slider 20 in the high preload design. The shape and amount of surface area of the air bearing surface 46, 48 determines the amount of lift generated during operation. A more detailed description of a possible shape of the disc opposing face 30 and how that shape generates lift on the air bearing slider 20 can be found in U.S. patent application Ser. No. 09/124,274 filed Jul. 29, 1998 by Berg, et al. entitled "AIR BEARING SLIDER WITH CORNER STEPS," which is assigned to Seagate Technology, Inc., the assignee of the present application and is hereby incorporated by reference.

Figure 4:
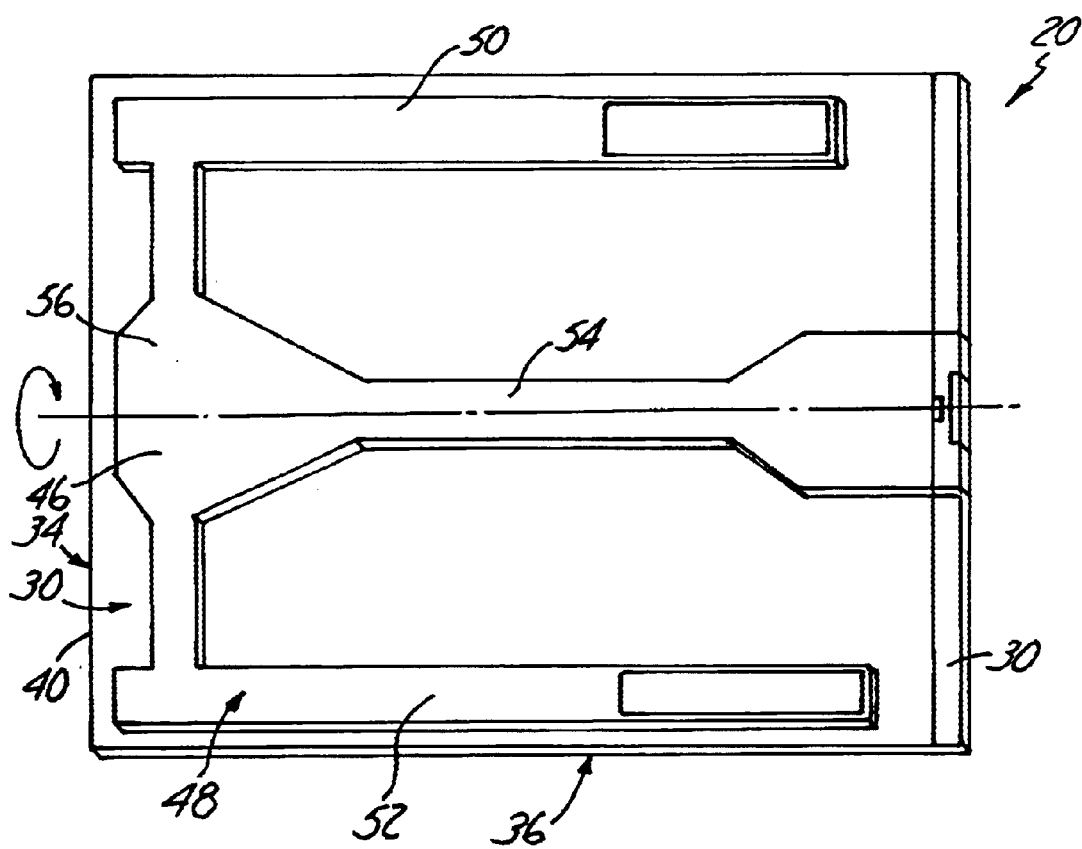
FIG. 4 shows a plan view of an air bearing surface of a slider.

FIG. 4 shows a perspective view of the disc opposing face 30 of the air bearing slider 20 according to the present invention. The disc opposing face 30 includes an air bearing projection 46 normal to and extending upwards from a disc opposing face 30. The air bearing projection 46 includes an air bearing surface 48 that is substantially parallel to the disc opposing face 30. The air bearing projection 46 operates to provide lift and stability to the air bearing slider 20 while the disc 22 is moving.

The air bearing surface 48 of the air bearing projection 46 is in apparent contact with the disc 22 while the disc 22 is stationary. More specifically, because of surface irregularities in the air bearing surface 48 and the surface of the disc 22, only a portion of the total surface area of the air bearing surface 48 is actually in contact with the surface of the disc 22.

The specific dimensions and configurations of the air bearing projection 46 can vary according to design requirements such that the desired lift, flying height, air bearing stiffness, and friction levels are satisfied. The present invention can be employed with almost any of the various configurations of the air bearing projection 46.

A preferred embodiment, shown in FIG. 4, includes a first side rail 50, a second side rail 52, a center rail 54, and a front rail or crossbar 56. The first side rail 50 and the second side rail 52 are disposed parallel to one another and parallel to the side faces 36. The first side rail 50 and the second side rail 52 traverse substantially the entire distance from the leading edge 40 to the trailing edge 38 and are disposed approximately equal distances from a longitudinal center line of the air bearing slider 20. The center rail 54 extends substantially from the leading edge 40 to the trailing edge 38 along the longitudinal center line of the air bearing slider 20. The front rail or crossbar 56 extends between the first side rail 50 and the second side rail 52 and is disposed generally parallel to the leading face 34.

The present invention is directed to an air bearing slider designed for operation at ultra-low flying heights. As previously discussed, ultra-low flying heights create a significant risk that catastrophic head-disc interface failure will occur. An ultra-low flying height is used to refer to flying heights of 0.5 micro inches and below. The present invention helps avoid catastrophic head-disc failure upon contact between the air bearing surface 48 of the slider 20 and the disc 22.

To determine where contact is likely to occur between the air bearing surface 48 of the slider 20 and the disc 22, the present invention performs head-disc spacing budget (HDSB) analysis on the particular configuration of the air bearing projection 46. HDSB analysis uses statistical methods to assess the sensitivity of the air bearing slider 20 to various design and process factors such as crown and camber of the rails, twist angle between rails, and torque generated by lead wires. HDSB analysis includes an analysis of the pitch and roll motions caused by a torque applied to the air bearing slider 20. The HDSB analysis yields the expected minimum spacing that would result between the air bearing surface 48 and the disc 22 in the form of a map of the air bearing surface 48. The results of the analysis also indicate which portions of the air bearing projection 46 are likely to undergo heavy interference contact with the disc 22 during operation. The HDSB analysis technique is more thoroughly discussed in U.S. patent application Ser. No. 09/250,453 filed Feb. 16, 1999 by Thomas R. Pitchford et al., entitled "APPARATUS, SYSTEM AND METHOD FOR OPTIMIZING THE DESIGN OF SLIDER PROTRUSIONS IN A HARD DISC DRIVE SYSTEM," which is assigned to Seagate Technology, Inc., the assignee of the present invention and is hereby incorporated by reference.

Methods other than HDSB analysis, however, could be employed to determine the likely or actual contact points. For example, a slider could be operated for a period of time and then examined to determine where on the air bearing surface wear has occurred. Also, experienced designers will be able to generally estimate where contact is likely to occur.

Figure 5A:
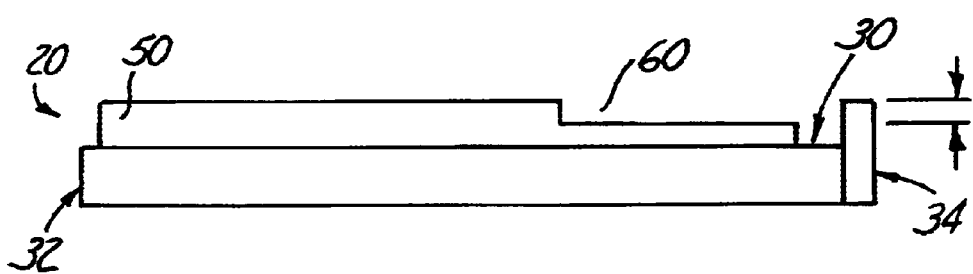
FIGS. 5A and 5B show a sectional view of the slider of FIG. 4.

Once the likely locations of heavy interference contact have been identified, an ion milling operation is performed on the identified portions of the air bearing surface 48 to remove some amount of material from those areas. FIG. 5A shows a sectional view of the air bearing slider 20 taken through the first side rail 50. The dimensions of the parts of the slider 20 are not drawn with correct proportions with respect to one another. Rather, the proportions are exaggerated for ease of illustration. As shown in FIG. 5A, a channel 60 has been cut or milled from a portion of the first side rail 50 on the right hand side near the trailing face 34. Channel 60 is cut into the first side rail 50 typically using a preferential ion milling technique. The channel 60 is generally made to a depth of 300 nanometers which is approximately one tenth of the depth of the air bearing slider 20 overall. This process is applied to all areas of the air bearing surface 48 that have been identified during HDSB analysis.

Figure 5B:
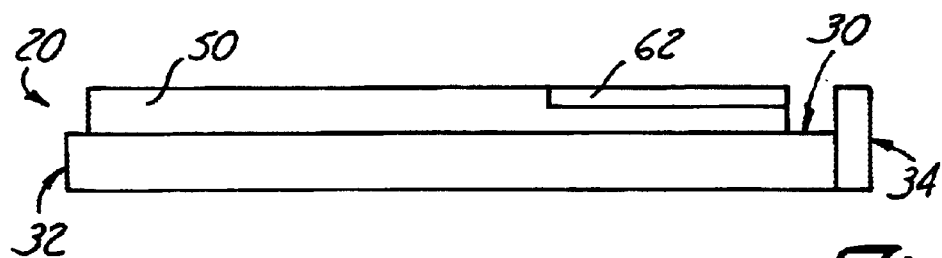

Once the channel 60 and all other areas of the air bearing surface 48 that have been identified during HDSB analysis have been milled to an appropriate depth, the channel 60 and all other identified areas are filled with a low-friction, high-wear-resistance material 62 as shown in FIG. 5B. FIG. 5B shows a longitudinal sectional view of the air bearing slider 20 running through the first side rail 50. As shown in FIG. 5B, the channel 60 has been filled with the low-friction, high-wear-resistance material 62 to give the air bearing surface 48 the same configuration as it had prior to the creation of the channel 60 using the ion milling operation. Likewise, all other areas that have been identified during HDSB analysis and removed are also filled with the low-friction, high-wear-resistance material 62. The material 62 is deposited in the channel 60 using any method commonly known to those or ordinary skill in the art, such as ion beam deposition.

As discussed above, the flying properties of the air bearing slider 20 are determined by the shape and configuration of the air bearing surface 48. The air bearing surface 48 is designed to give the air bearing slider 20 the proper fly height, adequate roll, and low take off speed among other goals. It is important therefore to deposit the low-friction, high-wear-resistance material 62 in such a manner as to return the air bearing surface 48 to the shape and configuration it had prior to performing preferential ion milling. It is important that the low-friction, high-wear-resistance material 62 be configured such that its outer surface lies in the same plane as the remainder of the air bearing surface 48, as shown in FIG. 5B. In other words, it may be necessary to remove a portion of the low-friction, high-wear-resistance material 62 by using a lapping process, which is a mechanical polishing of the surface. This will insure that the flying properties of the air bearing slider 20 remain unchanged. In a preferred embodiment, the low-friction, high-wear-resistance material 62 is made from diamond-like carbon (DLC) or silicon carbide (SiC). Other low-friction, high-wear-resistance materials could be employed with similar results.

Once all of the areas identified during HDSB analysis have been treated in the above-manner, the air bearing slider 20 will exhibit drastically improved wear characteristics. During operation, any contact between the air bearing slider 20 and the disc 22 will likely occur at the points identified during HDSB analysis and thus the contact will be between the disc and the low-friction, high-wear-resistance material 62. Any impact between the air bearing slider 20 and the disc 22 will create contact between the low-friction, high-wear-resistance material 62 and the disc 22 which will not cause noticeable damage.

A second aspect of the present invention relates to a device and a method for making a device having low stiction and friction coefficients. Low stiction and friction are beneficial for several reasons as discussed above. As a general principle, the smoother the interface between two materials, the greater the stiction and friction forces caused by meniscus and adhesion effects. The stiction and friction forces can be greatly decreased by roughening the contact areas because a rough surface will have a smaller contact area and thus lower frictional forces will be created.

One effective method for roughening the surface of the air bearing slider 48 is to use short ion milling operations. The air bearing surface 48 of the air bearing slider 20 is typically constructed from alumina titanium carbide ($Al_2O_3$/TiC). Standard ion milling of $Al_2O_3$/TiC will produce surface roughness, since each phase has a different etching rate. Also, the treatment of the contact areas may also include special surface topographical treatments such as discrete fine pitch surface roughness as disclosed in U.S. patent application Ser. No. 09/357,406 filed Jul. 20, 1999 by Andreas A. Polycarpou et al. entitled "REDUCING STICTION ON SLIDERS," which is assigned to Seagate Technology, Inc., the assignee of the present invention and is hereby incorporated by reference. This patent application discloses a technique for creating a controlled surface contour to assist in controlling contact stresses.

To minimize damage to the projections 46 of the air bearing slider 20 during operation, ideally the projection topography would be such that elastic contact conditions at the interface with the disc 22 are maintained upon impact. For example, the surface topography may be created such that the roughness is generally sinusoidal. Using this method, stress remains in the elastic regime and never exceeds yield strength, which thus prevents wear. Surface treatments, therefore can be used to improve both friction and wear characteristics of the air bearing slider 20. The surface treatments may be applied to the entire air bearing surface 48 or only to the low-friction, high-wear-resistance portions. When using this surface treatment technique on the areas of the air bearing surface 48 replaced with a low-friction, high-wear resistance material 62, the surface treatment is performed after preferential milling and before depositing the low-friction, high-wear-resistance material 62.

Another method used to decrease the stiction and friction forces is to mount landing pads on the air bearing surface 48. Landing pads operate to reduce friction between the air bearing slider 20 and the disc 22 by reducing the surface area of contact. The landing pads may be disposed on the air bearing surface 48 such that specified disc contact areas are created. These specified areas may then be treated using the techniques of the present invention.

FIGS. 6A–6C show bottom plan views of three distinct configurations of an air bearing slider 70 according to a second embodiment of the present invention. As shown in FIG. 6A, the air bearing slider 70 has a disc opposing face 72. The disc opposing face 72 has projections 74L, 74R, and 74T extending upward therefrom approximately normal to the disc opposing face 72. Projections or rails 74L and 74R are disposed along the left and right sides, respectively, of the disc opposing face 72. Projection or rail 74T is disposed near a longitudinal center line and near a trailing edge of the disc opposing face 72. A disc opposing surface of the projections or rails 74L, 74R, and 74T forms an air bearing surface 76. The air bearing surface 76 has landing pads 78 attached to it. Two of the landing pads 78 are attached to the projection or rail 74L and two of the landing pads 78 are attached to the projection or rail 74R. A portion of each of the projections or rails 74L, 74R, and 74T has been removed and replaced with a low-friction, high-wear-resistance material 80, such as diamond-like carbon (DLC) or silicon carbide (SiC), as shown by the crosshatching on the lower portion of FIG. 6. The landing pads 78 are constructed from a low-friction, high-wear-resistance material, such as DLC or SiC.

FIG. 6B shows a second variation of the air bearing slider 70 with an alternate configuration of projections to form a different air bearing surface. As shown in FIG. 6B, projections or rails 82L, 82R, and 82T form the air bearing surface 76. The projections or rails 82L and 82R are shorter in length than the corresponding projections or rails (74L and 74R) in FIG. 6A. In the configuration of FIG. 6B, only one landing pad 78 is placed on each of projections or rails 82L and 82R. Also, low-friction, high-wear-resistance material 80 has been used only on the trailing edge projection or rail 82T.

FIG. 6C shows a third variation of the air bearing slider 70. The configuration of the air bearing surface 76 shown in FIG. 6C is generally the same as the low preload configuration shown in FIG. 3B. As shown in FIG. 6C, projections 84L, 84F, 84C, 84T, and 84R form the air bearing surface 76. In the configuration shown in FIG. 6C, one landing pad has been placed on each of the projections 84L, 84C, and 84R. Also, low-friction, high-wear-resistance material 80 has been used on lower portions of projections 84L and 84R and on trailing edge projection 84T.

The air bearing slider 70 enjoys the benefit of low wear provided by the low-friction, high-wear-resistance material 80. The air bearing slider 70 further enjoys the benefit of low friction and stiction forces provided by the treatment of the air bearing surface 76. It should be apparent that configurations other than those illustrated in FIGS. 6A–6C, employing landing pads and low-friction, high-wear-resistance material, could also be used.

FIG. 7 shows a bottom plan view of an air bearing slider 90 according to a third embodiment of the present invention. The air bearing slider 90 has a disc opposing face 92. The disc opposing face 92 has projections 94L, 94R, and 94T extending upward therefrom approximately normal to the disc opposing face 92. The projections 94L, 94R, and 94T have an air bearing surface 96 facing the disc 22. Treated portions 98 of the air bearing surface 96 (marked with increasing diagonal crosshatching at the top of FIG. 7) have been treated using one of the surface roughening methods discussed above. The area marked with decreasing diagonal crosshatching (at the bottom of FIG. 7) has been removed and replaced with a low-friction, high-wear-resistance material 100 using the method set forth above with respect to the air bearing slider 20. In preferred embodiments, the low-friction, high-wear-resistance material 100 may be diamond-like carbon (DLC) or silicon carbide (SiC).

The air bearing slider 90 enjoys the characteristics of both heightened wear resistance and decreased friction and stiction forces. The wear resistance is improved by the presence of the low-friction, high-wear-resistance material 100. The decreased stiction and friction forces are a result of the surface treatment performed on the treated portions 98 of the air bearing surface 96 to roughen the air bearing surface 96.

While the preferred embodiment of the present invention has been described in detail, it should be apparent that many modifications and variations to it are possible, all of which fall within the true spirit and scope of the present invention. For example, while the present invention is described as reading and writing data from a rotating magnetic disc, the present invention is not intended to be limited in this respect. The transducing head and the recording surface may utilize magnetic, optical, or other data storage techniques to store data. Also, the techniques of the present invention will work equally well with any configuration of the projections used to form the air bearing surface of the slider. The particular air bearing surface configurations shown in the drawings are merely intended to be examples. Also, methods other than head-disc-spacing-budget analysis may be used to determine the likely points of contact between the air bearing surface of the slider and the recording media.

Although the present invention has been described with reference to preferred embodiments, workers skilled in the art will recognize that changes may be made in form and detail without departing from the spirit and scope of the invention.

What is claimed is:

1. A method for constructing an ultra-low-flying-height slider for carrying a transducing head in a disc drive system including a rotatable disc, the method comprising:

removing material from an air bearing surface of the slider to create a channel at a likely location of contact with the rotatable disc; and filling the channel with a low-friction, high-wear-resistance material such that the air bearing surface is configured the same as the air bearing surface configuration prior to removing material.

2. The method of claim 1, and further comprising:

analyzing the air bearing surface of the slider to determine the likely location of contact with the rotatable disc.

3. The method of claim 1, and further comprising:

analyzing the air bearing surface of the slider to determine the expected minimum spacing between the slider and the rotatable disc.

4. The method of claim 2 wherein analyzing is performed using head-disc spacing budget (HDSB) analysis.

5. The method of claim 4 wherein HDSB analysis includes analysis of the pitch and the roll generated in the slider by torsional forces applied to the slider.

6. The method of claim 1 wherein the removing step is performed using preferential ion milling of the air bearing surface of the slider.

7. The method of claim 1 wherein the filling step is performed using an ion beam deposition process.

8. The method of claim 1 wherein the material used to fill the channel is diamond-like carbon (DLC).

9. The method of claim 1 wherein the material used to fill the channel is silicon carbide (SiC).

10. The method of claim 1, and further comprising:
    roughening the air bearing surface of the slider prior to filling the channel.

11. The method of claim 1, and further comprising:
    performing ion milling on the air bearing surface of the slider to produce a rough surface area.

12. The method of claim 1, and further comprising:
    performing reactive ion etching on the air bearing surface of the slider to produce a rough surface area.

13. The method of claim 1, and further comprising:
    forming at least two landing pads on the air bearing surface.

14. A method for constructing an air bearing slider, the air bearing slider carrying a transducing head above a rotatable disc in a disc drive system and the air bearing slider having a disc opposing face, the disc opposing face having an air bearing surface elevated above the disc opposing face, the method comprising:

analyzing the air bearing surface to locate a plurality of contact points at a likely location of contact between the slider and the disc;

forming a plurality of channels recessed from the air bearing surface, the channels formed approximately at the contact points; and depositing a low-friction, high-wear-resistance material in the channels such that an exposed surface of the low-friction, high-wear-resistance material lies in substantially the same plane as the air bearing surface.

15. The method of claim 14 wherein analyzing the air bearing surface is performed using head-disc spacing budget (HDSB) analysis.

16. The method of claim 14 wherein forming the plurality of channels comprises removing a portion of the air bearing surface.

17. The method of claim 16 wherein the portion of the air bearing surface is removed using a preferential ion milling process.

18. The method of claim 14 wherein depositing the low-friction, high-wear-resistance material in the channels is performed using an ion beam deposition process.

19. The method of claim 14, and further comprising:
    roughening the air bearing surface.

20. The method of claim 14, and further comprising:
    forming at least two landing pads on the air bearing surface.

* * * * *

UNITED STATES PATENT AND TRADEMARK OFFICE
CERTIFICATE OF CORRECTION

PATENT NO. : 6,647,612 B1
DATED : November 18, 2003
INVENTOR(S) : Zine-Eddine Boutaghou It is certified that error appears in the above-identified patent and that said Letters Patent is hereby corrected as shown below:

<u>Column 2,</u>
Line 15, delete "stiffiness" and insert -- stiffness --

Signed and Sealed this

Thirteenth Day of January, 2004

JON W. DUDAS
*Acting Director of the United States Patent and Trademark Office*